US008624927B2

(12) United States Patent
Ohmori et al.

(10) Patent No.: US 8,624,927 B2
(45) Date of Patent: Jan. 7, 2014

(54) DISPLAY APPARATUS, DISPLAY CONTROL METHOD, AND DISPLAY CONTROL PROGRAM

(75) Inventors: Kenta Ohmori, Tokyo (JP); Takashi Kawakami, Tokyo (JP)

(73) Assignees: Sony Corporation, Tokyo (JP); Sony Mobile Communications, Inc., Tokyo (JP)

( * ) Notice: Subject to any disclaimer, the term of this patent is extended or adjusted under 35 U.S.C. 154(b) by 703 days.

(21) Appl. No.: 12/690,386

(22) Filed: Jan. 20, 2010

(65) Prior Publication Data

US 2010/0188426 A1 Jul. 29, 2010

(30) Foreign Application Priority Data

Jan. 27, 2009 (JP) .............................. P2009-015137

(51) Int. Cl.
*G09G 5/00* (2006.01)
(52) U.S. Cl.
USPC ........... 345/660; 345/661; 345/665; 345/668; 345/156; 715/863
(58) Field of Classification Search
USPC ......... 345/4, 8, 156, 158, 661, 659, 660, 665, 345/668, 173, 667, 31; 715/863, 800, 781; 348/61, 333.01; 382/107
See application file for complete search history.

(56) References Cited

U.S. PATENT DOCUMENTS

| | | | |
|---|---|---|---|
| 5,917,460 A * | 6/1999 | Kodama ............................ 345/8 |
| 6,864,912 B1 * | 3/2005 | Mahaffey et al. ............... 348/61 |
| 2002/0089467 A1 * | 7/2002 | Hara ................................ 345/4 |
| 2003/0080937 A1 * | 5/2003 | Light ............................ 345/156 |
| 2003/0210258 A1 | 11/2003 | Williams |
| 2006/0164382 A1 * | 7/2006 | Kulas et al. .................... 345/156 |
| 2007/0273712 A1 | 11/2007 | O'Mullan et al. |
| 2007/0279591 A1 * | 12/2007 | Wezowski et al. ............. 351/208 |
| 2008/0199049 A1 * | 8/2008 | Daly ............................. 382/107 |
| 2008/0276196 A1 * | 11/2008 | Tang ............................. 715/800 |
| 2009/0103621 A1 * | 4/2009 | Numata et al. ........... 375/240.16 |
| 2009/0109130 A1 * | 4/2009 | Murphy et al. ................. 345/31 |
| 2009/0271732 A1 * | 10/2009 | Kondo et al. .................. 715/781 |
| 2009/0295832 A1 * | 12/2009 | Takatsuka et al. ............. 345/659 |
| 2010/0125816 A1 * | 5/2010 | Bezos .......................... 715/863 |
| 2010/0253825 A1 * | 10/2010 | Horie ....................... 348/333.01 |
| 2011/0006978 A1 * | 1/2011 | Yuan ............................ 345/156 |

(Continued)

FOREIGN PATENT DOCUMENTS

| | | |
|---|---|---|
| JP | 7 44143 | 2/1995 |
| JP | 2005-25170 | 1/2005 |

(Continued)

OTHER PUBLICATIONS

Search Report issued in corresponding European application No. 10250071.7.

(Continued)

*Primary Examiner* — Chante Harrison
(74) *Attorney, Agent, or Firm* — Frommer Lawrence & Haug; William S. Frommer

(57) ABSTRACT

A display apparatus includes a display unit displaying information on a display screen, a distance detector detecting a distance from the display screen to the face of an operator, and a controller causing the information to be enlarged and reduced on the display screen in response to a change of the detected distance.

11 Claims, 15 Drawing Sheets

(56) References Cited

U.S. PATENT DOCUMENTS

| | | | |
|---|---|---|---|
| 2011/0018875 A1* | 1/2011 | Arahari et al. | 345/420 |
| 2011/0090149 A1* | 4/2011 | Larsen et al. | 345/158 |
| 2011/0175932 A1* | 7/2011 | Yu et al. | 345/661 |
| 2011/0254865 A1* | 10/2011 | Yee et al. | 345/661 |
| 2011/0304557 A1* | 12/2011 | Wilburn et al. | 345/173 |
| 2012/0017147 A1* | 1/2012 | Mark | 345/158 |
| 2012/0287163 A1* | 11/2012 | Djavaherian | 345/667 |

FOREIGN PATENT DOCUMENTS

| | | |
|---|---|---|
| JP | 2005 284487 | 10/2005 |
| JP | 2006 14223 | 1/2006 |
| JP | 2007-36802 | 2/2007 |
| JP | 2007 164814 | 6/2007 |
| JP | 2007 220010 | 8/2007 |
| JP | 2008 65837 | 3/2008 |
| JP | 2008 77655 | 4/2008 |
| JP | 2008 146164 | 6/2008 |
| JP | 2008-294815 | 12/2008 |
| TW | 544637 | 8/2003 |
| WO | WO 2006/097722 | 9/2006 |

OTHER PUBLICATIONS

Varona, J. et al., "Hands-free vision-based interface for computer accessibility", Journal of Network and Computer Applications, Academic Press, New York, NY, US, vol. 31, No. 4, 1 Nov. 2008, pp. 357-374, XP023316579.

* cited by examiner

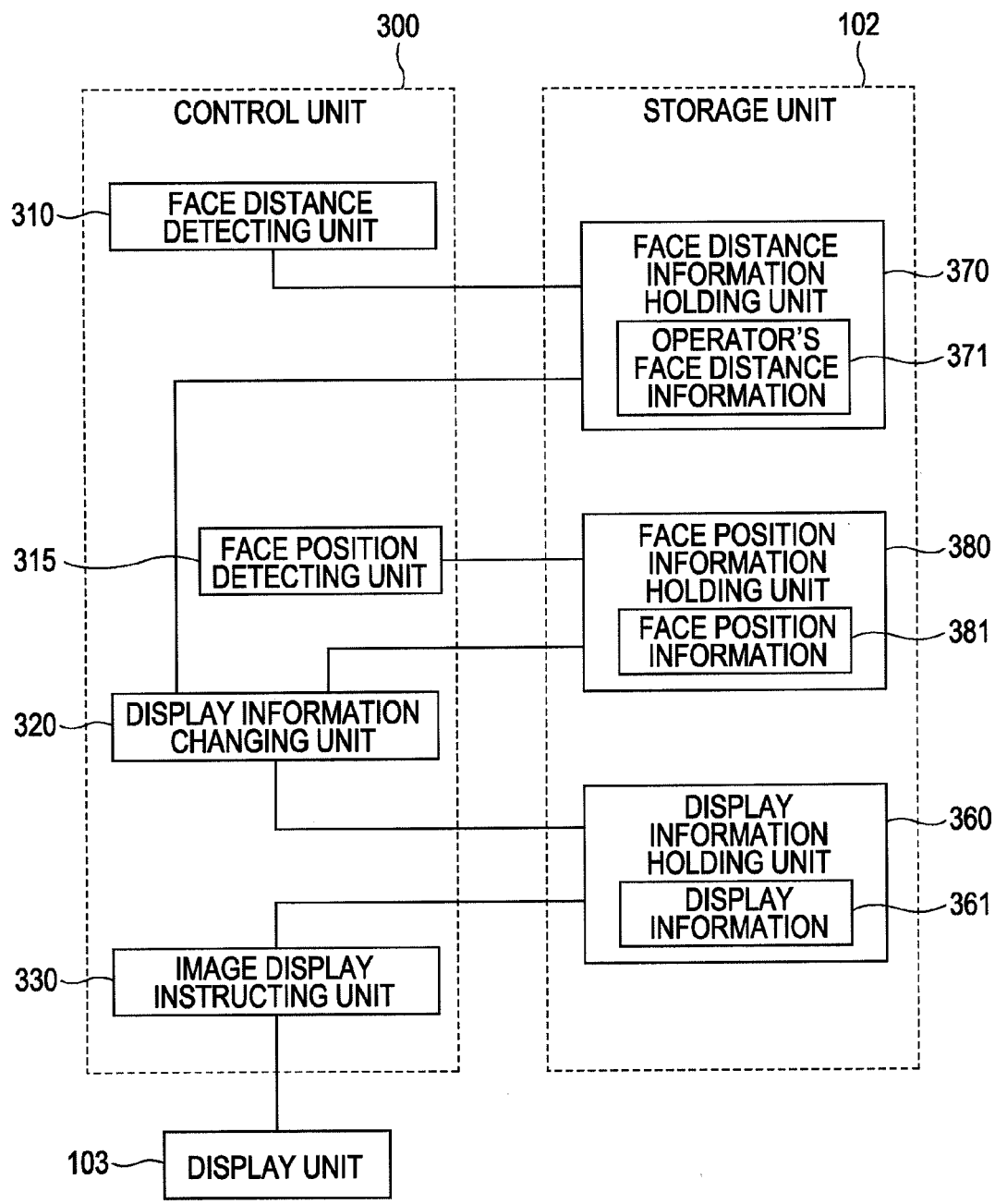

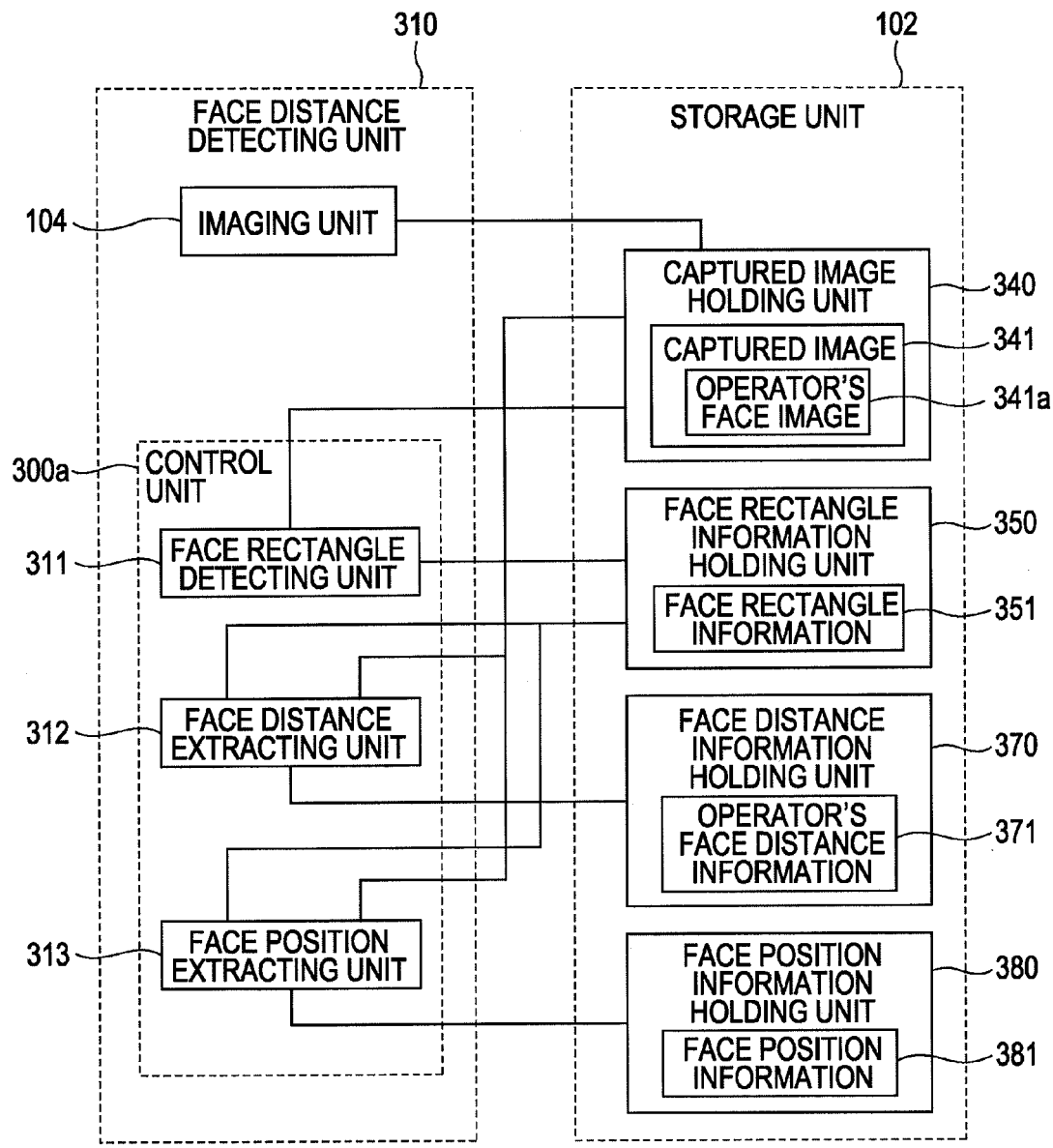

DISTANCE BETWEEN OPERATOR'S EYES

DISTANCE BETWEEN
OPERATOR'S EYES

DISTANCE BETWEEN
OPERATOR'S EYES

DISPLAY APPARATUS, DISPLAY CONTROL METHOD, AND DISPLAY CONTROL PROGRAM

BACKGROUND OF THE INVENTION

1. Field of the Invention

The present invention relates to a display apparatus and, more particularly, to a mobile terminal with a display screen and a display control method.

2. Description of the Related Art

Some mobile terminals with a display screen, such as portable telephone terminals, have a function of changing the size of characters and the like presented on the display screen. This function enables information to be presented in a legible size to an operator even with weak eyesight.

Japanese Unexamined Patent Application Publication No. 2006-14223 discloses a technique of changing the size of text on a display screen in response to an operation of an operation key on a portable terminal and also adjusting the display contents of the text to conform to the display format of the text.

Japanese Unexamined Patent Application Publication No. 2008-65837 discloses a technique of detecting a movement direction and movement amount of a display unit by using a triaxial acceleration sensor incorporated near the display unit on a portable electronic device to enlarge or reduce display information on the display screen at a display magnification ratio according to the movement amount.

Japanese Unexamined Patent Application Publication No. 2005-284487 proposes a technique of promptly determining a face image from a captured image with a small amount of calculation.

SUMMARY OF THE INVENTION

To change a character size as disclosed in Japanese Unexamined Patent Application Publication No. 2006-14223, the operator typically operates a specific operation key. This disadvantageously makes the operating method of the mobile terminal even more complex.

Moreover, in addition to changing the enlargement/reduction ratio according to the contents to be displayed, it may be desired to view details of, for example, a map by enlarging the contents or to widely view the entirety by reducing the contents. In such cases, it may be bothersome to perform an enlarging or reducing operation each time to enlarge or reduce the map.

According to the technique disclosed in Japanese Unexamined Patent Application Publication No. 2008-65837, the display information can be enlarged or reduced only by moving a hand that holds the device in the vertical direction, making it possible to mitigate the bother of the manual operation by the operator. With this technique, however, the movement of the device itself is detected by detecting an acceleration in only one axial (Z-axis) direction of the triaxial acceleration sensor. Therefore, a relative positional relation between the operator and the device is not considered. For example, when the operator moves his/her face closer to or away from the device without moving the device, the display magnification ratio remains unchanged. Moreover, depending on the operator's posture, such as when the operator holds and operates the device while lying down, a local relation between the axial direction and vertical axial direction of the device is changed, thereby possibly causing a malfunction in the same operator's operation.

It is desirable to provide a technique of easily and intuitively enlarging or reducing display information irrespectively of the operator's posture.

A display apparatus according to an embodiment of the present invention includes display means for displaying information on a display screen, distance detecting means for detecting a distance from the display screen to the face of an operator, and control means for causing the information to be enlarged or reduced on the display screen in response to a change of the detected distance. The distance from the display screen to the face of the operator is changed by relatively moving the face of the operator with respect to the display screen. Therefore, bothersome operations, such as key operations and menu operations, can be omitted in an enlarging or reducing operation.

More specifically, the distance detecting means includes imaging means for capturing an image of the face of the operator who is viewing the display screen, and the control means can detect the distance from the display screen to the face of the operator by detecting a ratio of a face image of the operator to the captured image.

The control means determines a magnification ratio of the image according to a ratio or difference in detection size of the face image with respect to its reference size. Alternatively, the control means continues to cause the image to be enlarged or reduced successively or stepwise according to a sign of the difference in detection size of the face image with respect to the reference size, and stops changing the magnification ratio when the difference becomes 0.

A display control method according to another embodiment of the present invention includes the steps of displaying information on a display screen, detecting a distance from the display screen to the face of an operator, and causing the information to be enlarged or reduced on the display screen in response to a change of the detected distance.

According to still another embodiment of the present invention, a display control program that causes a computer to perform the steps described above can be provided.

According to the embodiments of the present invention, the operator changes a relative position of his/her face with respect to the display device, thereby allowing easy and intuitive enlargement or reduction of display irrespectively of the operator's posture. Therefore, it is possible to freely make a transition between an at-a-glance display and a detailed display of the display contents. User interface's operability can then be improved.

BRIEF DESCRIPTION OF THE DRAWINGS

FIG. 3 is a functional block diagram depicting main functions of the mobile terminal in the embodiment of the present invention;

FIG. 4 is a block diagram depicting an example of the structure of a face distance detecting unit in the embodiment of the present invention;

DESCRIPTION OF THE PREFERRED EMBODIMENTS

Preferred embodiments of the present invention are described in detail below with reference to the drawings.

Figure 1:
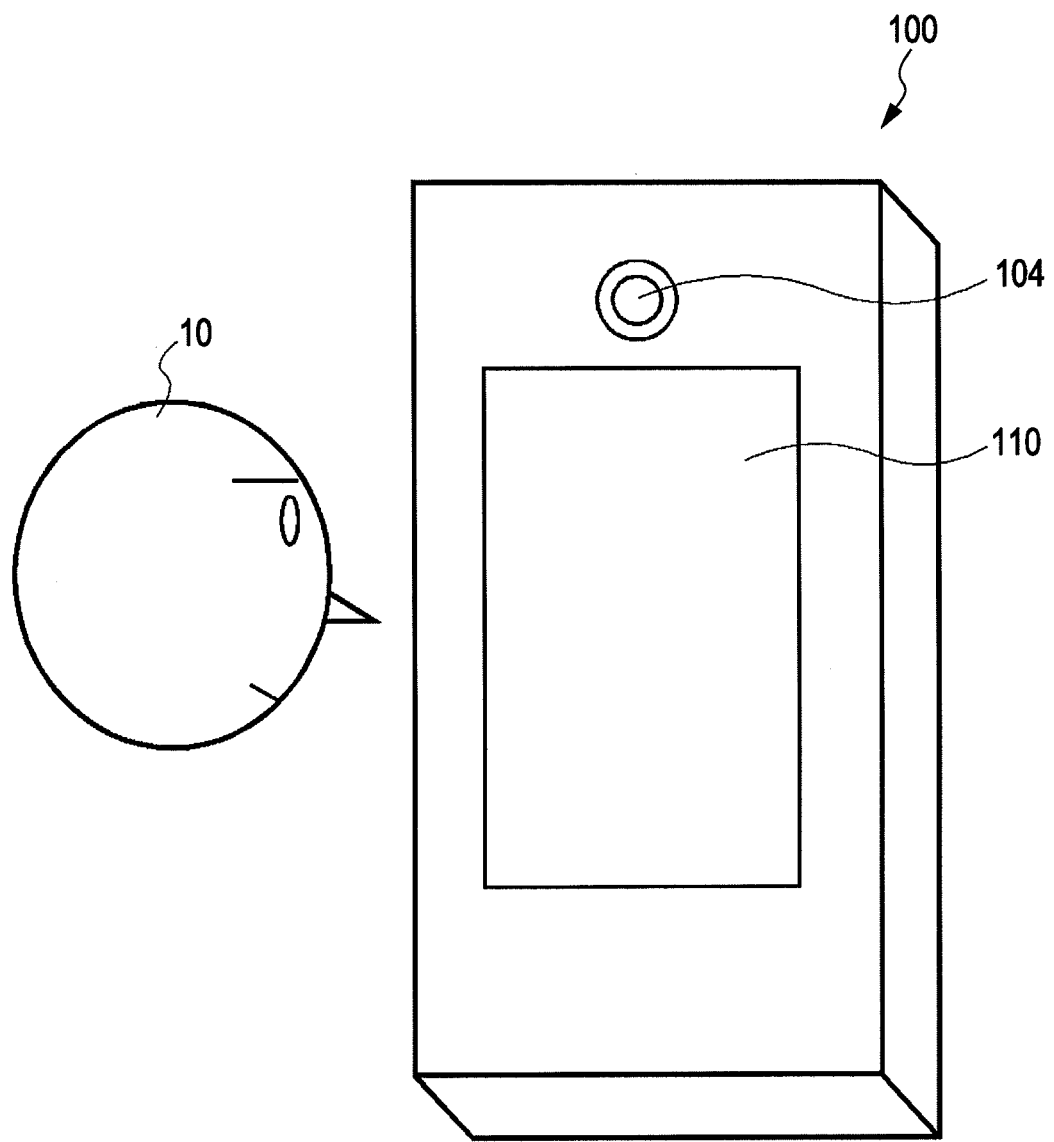
FIG. 1 schematically depicts the structure of a mobile terminal according to an embodiment of the present invention.

FIG. 1 schematically depicts the structure of a mobile terminal 100 according to an embodiment of the present invention. This mobile terminal 100 is assumed to be, for example, a portable telephone terminal, and is also simply referred to below as a terminal.

The mobile terminal 100 displays arbitrary display information, such as text and images, on a display screen 110. The mobile terminal 100 also obtains from an imaging unit 104 an image of the face (a face image) of an operator 10 (that is, a user) viewing this display screen 110. In an embodiment of the present invention, the imaging unit 104 is equivalent to a device, such as a digital camera, that captures an image of the operator viewing the display screen. The imaging unit 104 may be an imaging portion, for capturing an image of a subject ahead of the operator, which is rotated to an operator side, or may be another imaging portion with a lens fixedly oriented to the operator for videophones or the like. However, to effectively detect the movement of the face of the operator in a direction parallel to the display screen as described below, the imaging unit 104 preferably allows wide-angle capturing to some degree.

Furthermore, although not shown in FIG. 1, the mobile terminal 100 typically includes an operation unit with various operation keys and others provided to portable telephone terminals or the like. The mobile terminal 100 is not particularly restricted to be of, for example, a foldable, slidable, or straight type.

Figure 2:
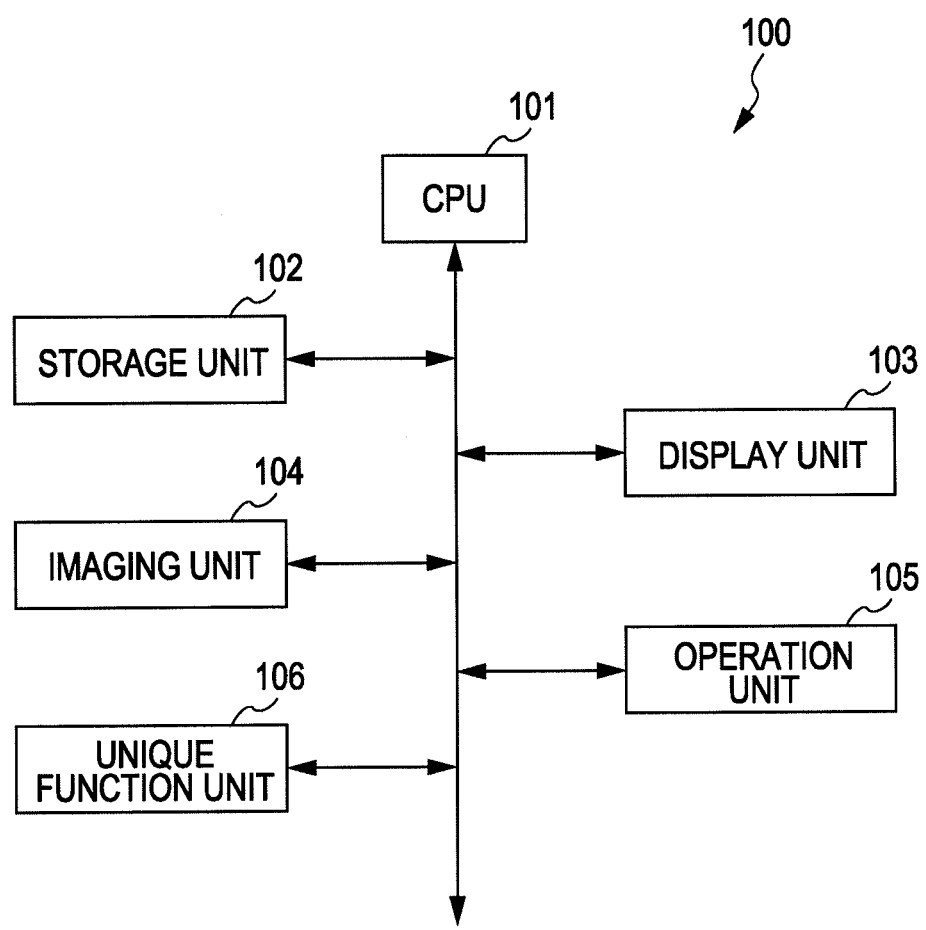
FIG. 2 schematically depicts the hardware structure of the mobile terminal in FIG. 1.

FIG. 2 schematically depicts the hardware structure of the mobile terminal 100 in FIG. 1.

In addition to the imaging unit 104, the mobile terminal 100 includes a CPU 101, a storage unit 102, a display unit 103, an operation unit 105, and a unique function unit 106.

The CPU 101 configures a controller according to an embodiment of the present invention. The CPU 101 controls the entire mobile terminal 100 by executing various programs including a system program in the terminal apparatus and a display control program according to an embodiment of the present invention, and performs various processes.

The storage unit 102 stores programs to be executed by the CPU 101 and necessary data, and can include an internal storage devices, such as a ROM, a RAM, a flash memory, and an HDD, as well as a removable storage medium. Display information, described below, and captured image information obtained by the imaging unit 104 are also stored in the storage unit 102.

The display unit 103 displays arbitrary display information on the display screen 110 depicted in FIG. 1, and includes a display device, such as an LCD or an organic EL.

The imaging unit 104 can capture an image of the face of the operator 10, as described with reference to FIG. 1.

The operation unit 105 receives an input operation from the operator, as described with reference to FIG. 1.

The unique function unit 106 performs unique functions provided to each mobile terminal, and is at least any one of, for example, a music replaying unit, an image replaying unit, a motion-picture replaying unit, a GPS function unit, and a non-contact IC function unit.

Units included in a typical portable telephone terminal, such as a wireless communication unit, a vibration generating unit, an LED light-emitting unit, and a power supply unit, are omitted in FIG. 2.

FIG. 3 is a functional block diagram depicting main functions of the mobile terminal 100 in the embodiment of the present invention.

A control unit 300 includes a face distance detecting unit 310, a face position detecting unit 315, a display information changing unit 320, and an image display instructing unit 330.

The face distance detecting unit 310 detects a distance (face distance) from the mobile terminal (display screen) to the face of the operator, and stores the detected distance in a face distance information holding unit 370 in the storage unit 102 as operator's face distance information 371.

The storage unit 102 also includes a display information holding unit 360 that stores display information 361 containing characters and images to be eventually presented to the operator with the use of the display unit 103.

The face position detecting unit 315 detects face position information 381 representing a relative position of the face of the operator with respect to the mobile terminal (display screen), and stores the detected face position information 381 in a face position information holding unit 380.

The display information changing unit 320 changes the display information 361 based on the operator's face distance information 371.

The image display instructing unit 330 instructs the display unit 103 to display the display information 361 changed by the display information changing unit 320.

The display unit 103 displays the image as instructed by the image display instructing unit 330.

An example of a principle and technique of detecting a face distance by the face distance detecting unit 310 is described with reference to FIG. 4, although not particularly restrictive.

FIG. 4 is a block diagram depicting an example of the structure of the face distance detecting unit 310.

The face distance detecting unit 310 includes the imaging unit 104 and a control unit 300a. A captured image 341 obtained by the imaging unit 104 is stored in a captured image holding unit 340 in the storage unit 102. The captured image 341 preferably includes an operator's face image 341a.

The control unit 300a includes a face rectangle detecting unit 311, a face distance extracting unit 312, and a face position extracting unit 313.

The face rectangle detecting unit 311 detects a rectangle (for example, a rectangle including eyes or a rectangle including both eyes and a nose) corresponding to a portion of the face of the operator in the captured image 341 obtained by the imaging unit 104, and obtains face rectangle information 351. The face rectangle information 351 is stored in a face rectangle information holding unit 350 in the storage unit 102. The face rectangle information 351 includes such information as coordinates of a predetermined point (for example, an upper-left point) of the face rectangle and information about the width and height of the face rectangle. In place of the width and height information, coordinates of diagonal points of the face rectangle may be used.

To detect a face rectangle, a related technique as disclosed in Japanese Unexamined Patent Application Publication No. 2005-284487 described above can be used. For example, a large amount of information about faces are learned in advance and constructed as dictionary data for face detection. Next, the input captured image 341 is compared with the information stored in the dictionary for face detection while being enlarged or reduced, and an operation of determining any similar portion is repeated to detect a face rectangle. By using this technique, information about face elements, such as eyes, a nose, and a mouth, can be extracted from the captured image 341, and their positions and consequently a face region, facial expressions, and others can be rapidly detected as face rectangle information. The face elements may include a frame of eyeglasses. The face rectangle information reflects the position and the distance of the face of the operator with respect to the imaging unit 104 and changes of the position and the distance, as described later.

The face distance extracting unit 312 detects a distance from the face of the operator with respect to the display screen 110 in a relative size (ratio) of the face image 341a with respect to the captured image 341. Here, "relative" indicates that moving the face from or to the terminal standing still is equivalent to moving the terminal from or to the face standing still.

The face position extracting unit 313 detects a relative position of the face of the operator with respect to the display screen 110 in the position of the face image 341a with respect to the captured image 341.

In this manner, according to the technique of detecting a face distance by using the face image of the operator, not only the size of the face image with respect to the captured image but also the position thereof can be detected.

Figure 5A:
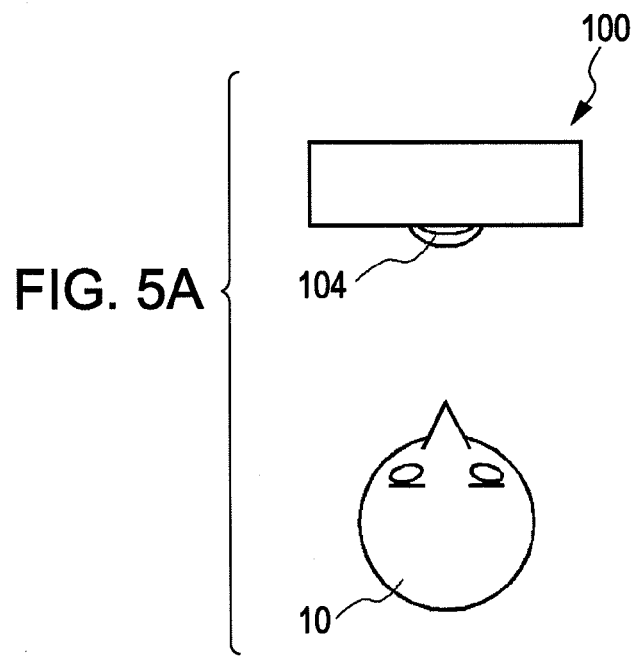
FIGS. 5A and 5B depict a first example of a relation between a captured image and an operator's face image included in the captured image in the embodiment of the present invention.
Figure 5B:
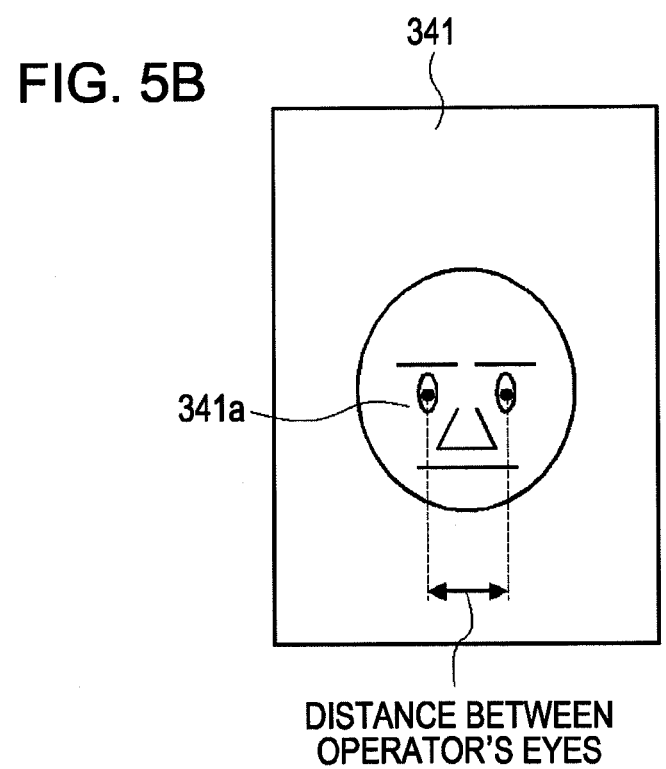
Figure 6A:
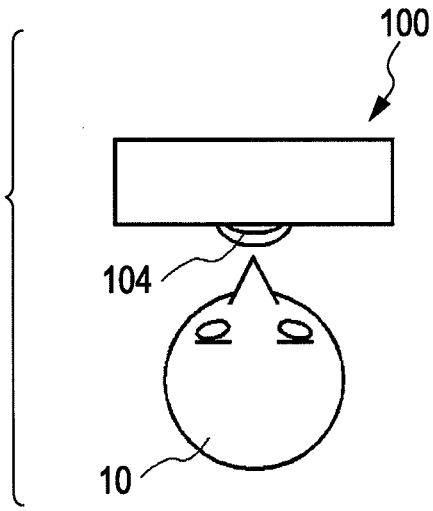
FIGS. 6A and 6B depict a second example of the relation between the captured image and the operator's face image included in the captured image in the embodiment of the present invention.
Figure 6B:
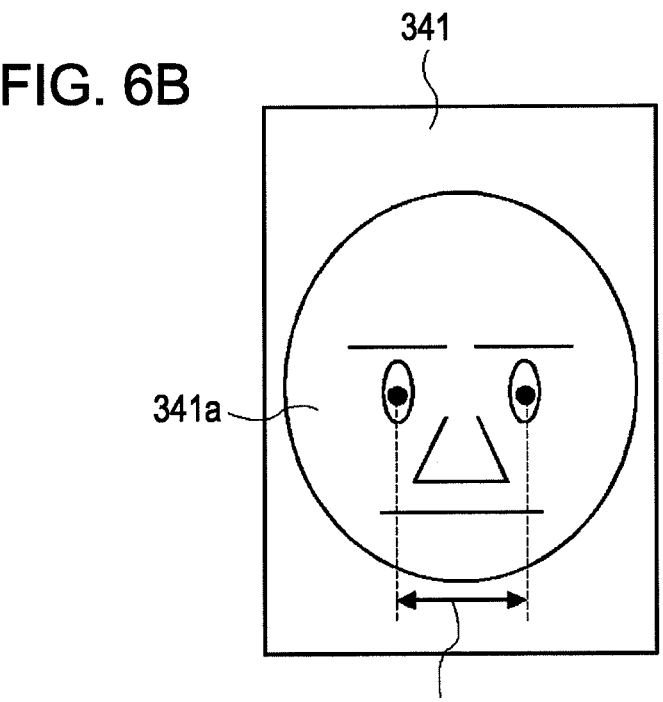
Figure 7A:
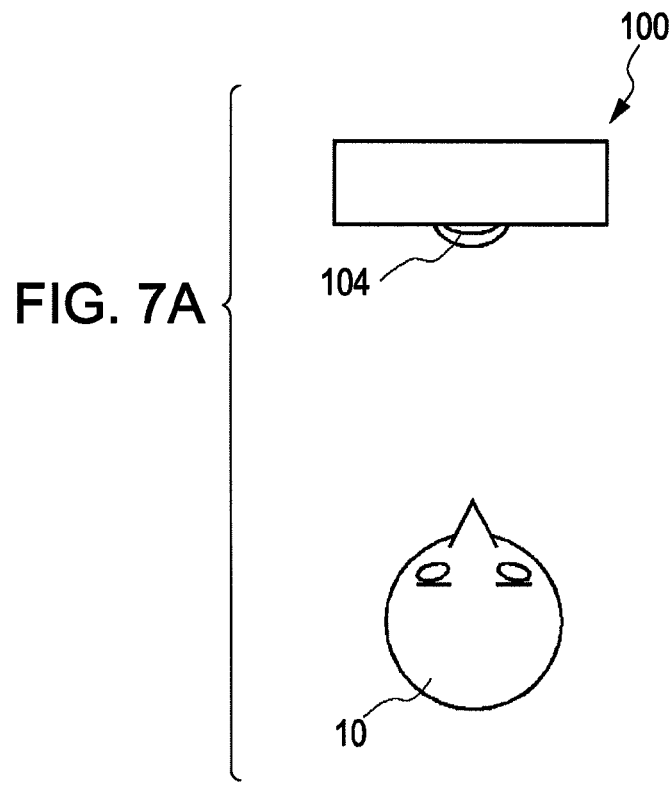
FIGS. 7A and 7B depict a third example of the relation between the captured image and the operator's face image included in the captured image in the embodiment of the present invention.
Figure 7B:
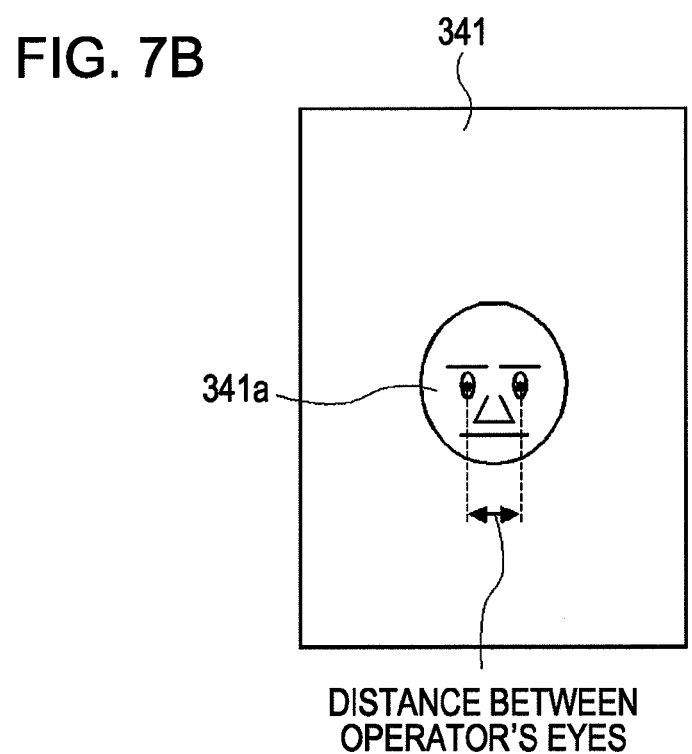

FIGS. 5A, 5B, 6A, 6B, 7A, and 7B depict relations between the captured image 341 and the face image 341a of the operator included in that captured image 341. With these relations, the distance and position of the face of the operator with respect to the portable terminal can be recognized based on the captured image 341, which is now described below. Each of FIGS. 5A, 6A, and 7A depicts a positional relation between the portable terminal and the operator viewed from top. Each of FIGS. 5B, 6B, and 7B depicts the captured image 341 stored in the captured image holding unit 340 in the states depicted in FIGS. 5A, 6A, and 7A, respectively. From the captured image 341, face rectangle information is detected by using the related technique as described above.

With reference to FIGS. 5A, 5B, 6A, 6B, 7A, and 7B, a technique of finding a face distance and face position of the operator based on a positional relation between the captured image 341 and the face rectangle corresponding to the operator's face image 341a is described below.

First, as depicted in FIG. 5A, it is assumed that (the face of) the operator 10 is positioned straight in front of the display screen 110. In this case, as depicted in FIG. 5B, the operator's face image 341a included in the captured image 341 is positioned at the center of the captured image 341. Here, when the display screen 110 and the imaging unit 104 are shifted in position, even if the face is positioned straight in front of the display screen 110, the face image 341a in the captured image 341 obtained by the imaging unit 104 may be shifted from the center. In this case, an amount of positional shift of the face image 341a with respect to the captured image 341 can be corrected.

By contrast, when the operator 10 relatively moves from the state shown in FIG. 5A to left with respect to the display screen 110, the operator's face image 341a included in the captured image 341 moves from the state shown in FIG. 5B to a left side in the captured image.

In this manner, by detecting the position of the operator's face image 341a included in the captured image 341, the direction in which the operator 10 is positioned with respect to the imaging unit 104 or the display screen 110 and also to the mobile terminal 100 can be determined.

Next, when the operator 10 gets closer to the imaging unit 104 as depicted in FIG. 6A, the size (face size) of the operator's face image 341a included in the captured image 341 (more specifically, for example, a distance between operator's eyes on the captured image 341) is large with respect to the captured image 341, as depicted in FIG. 6B. In practice, by detecting a relative dimension of the face size with respect to the captured image 341 using a face detector, the distance from the operator 10 to the imaging unit 104 can be determined. In other words, a change of the distance can be detected based on a change of the face size. Here, the width of the face rectangle can be used substantially as a distance between eyes, which is an indicator of the face size. Alternatively, the distance can be similarly determined based on face size information obtained by using a distance between elements configuring a face, such as a nose, a mouth, and eyebrows, and the size of the entire face included in the captured image 341.

Furthermore, when the operator 10 moves away from the imaging unit 104 as depicted in FIG. 7A, the distance between operator's eyes in the operator's face image 341a included in the captured image 341 is relatively small with respect to the captured image 341, as depicted in FIG. 7B.

In this manner, by detecting a relative dimension of the distance between operator's eyes included in the captured image 341 using the face detector, the distance (face distance) from the operator to the imaging unit (and also the display screen) can be determined.

Figure 8A:
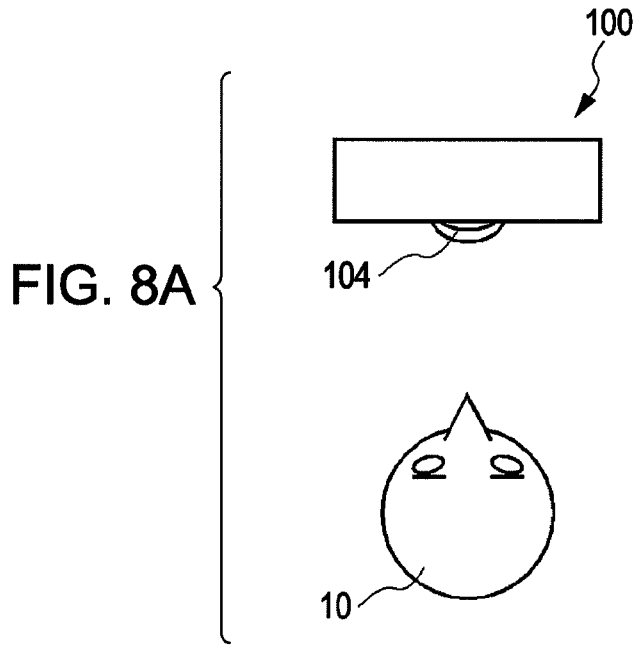
FIGS. 8A and 8B depict an example when a magnification ratio of display information on a display screen of the mobile terminal in the case in FIGS. 5A and 5B is changed in a hands-free manner.
Figure 8B:
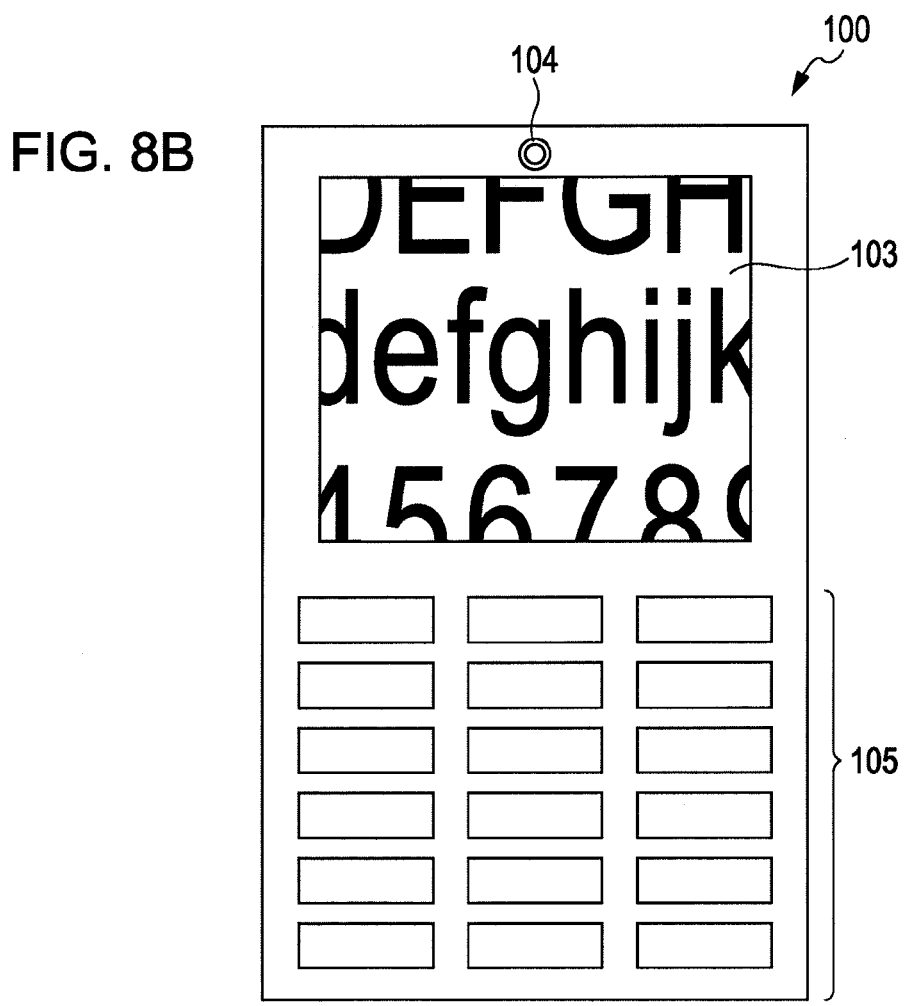
Figure 9A:
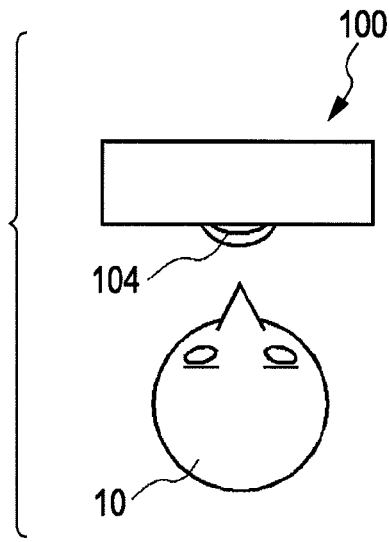
FIGS. 9A and 9B depict an example when a magnification ratio of display information on the display screen of the mobile terminal in the case in FIGS. 6A and 6B is changed in a hands-free manner.
Figure 9B:
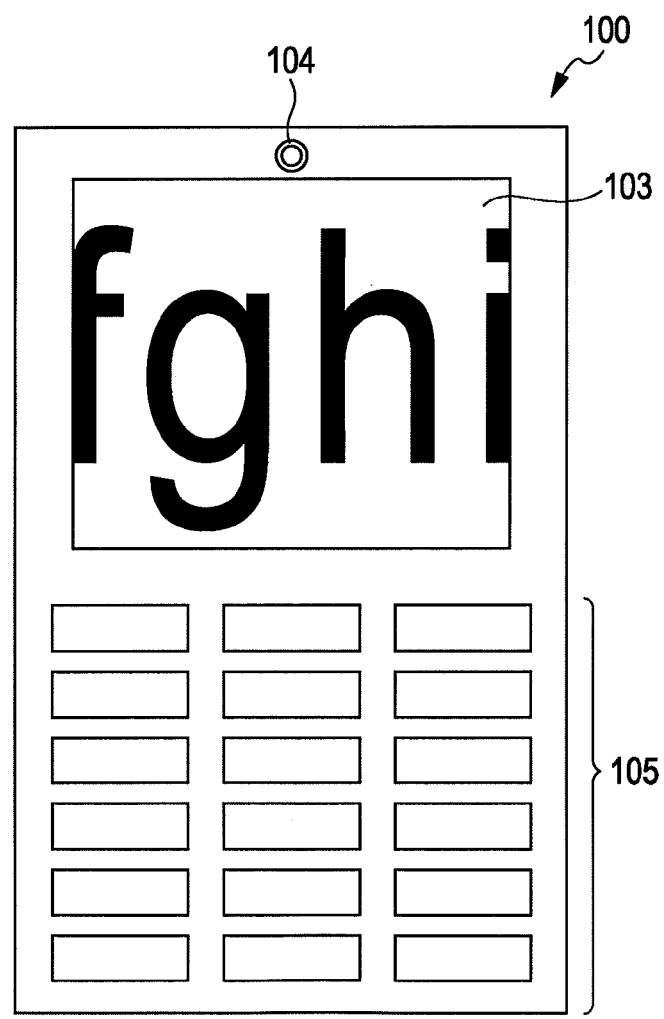
Figure 10A:
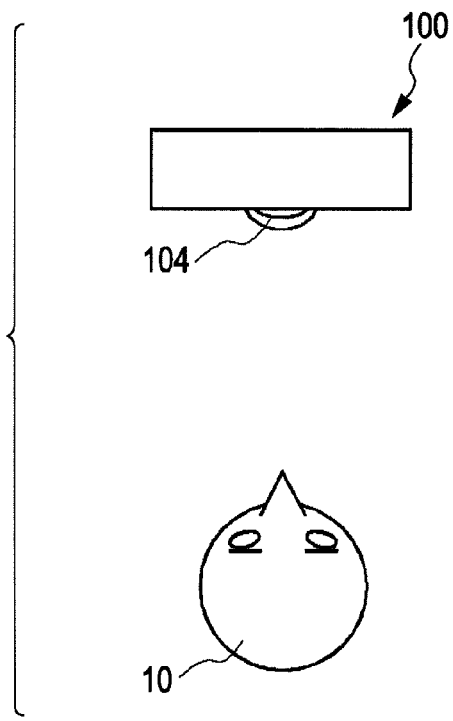
FIGS. 10A and 10B depict an example when a magnification ratio of display information in the display screen of the mobile terminal in the case in FIGS. 7A and 7B is changed in a hands-free manner.
Figure 10B:
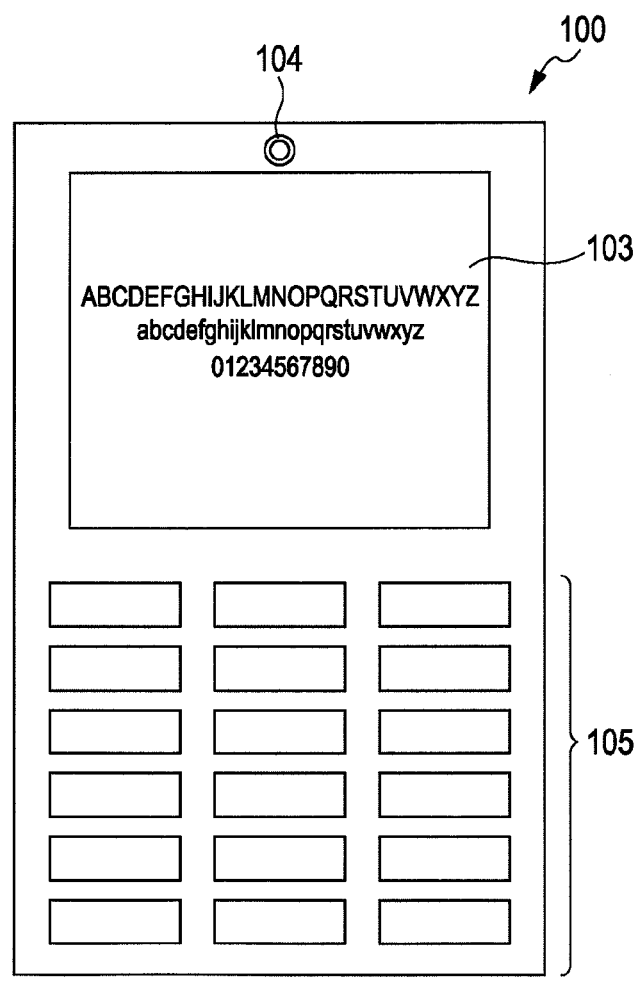

FIGS. 8A, 8B, 9A, 9B, 10A, and 10B depict examples when the magnification ratio of display information on the display screen of the mobile terminal 100 in the respective cases in FIGS. 5A, 5B, 6A, 6B, 7A, and 7B is changed in a hands-free manner. Here, "hands-free" indicates that the operator is free from any key operation or menu operation, and does not indicate that both hands are completely available (normally, at least one hand is used to hold the mobile terminal 100). That is, each of FIGS. 8A, 9A, and 10A depicts a positional relation between the operator 10 and the mobile terminal 100. Each of FIGS. 8B, 9B, and 10B depicts a display example of the same display contents. The display contents in this example represent text (that is, characters). As is evident from these drawings, in comparison with the case in FIG. 8A where the face distance of the operator 10 is a standard intermediate distance, when the face distance becomes short because the operator 10 gets closer to the mobile terminal 100 as depicted in FIG. 9A, the text (that is, the character size) is displayed as being enlarged as depicted in FIG. 9B, compared with the case in FIG. 8B. Also, in comparison with the case in FIG. 8A, when the face distance becomes long because the operator 10 moves away from the mobile terminal 100 as depicted in FIG. 10A, the text is displayed as being reduced as depicted in FIG. 10B, compared with the case in FIG. 8B.

In this manner, when the operator 10 relatively moves his/her face closer to the mobile terminal 100, the display contents (display image) are displayed as being enlarged. When the operator 10 moves his/her face away from the mobile terminal 100, the display contents are displayed as being reduced.

Figure 11A:
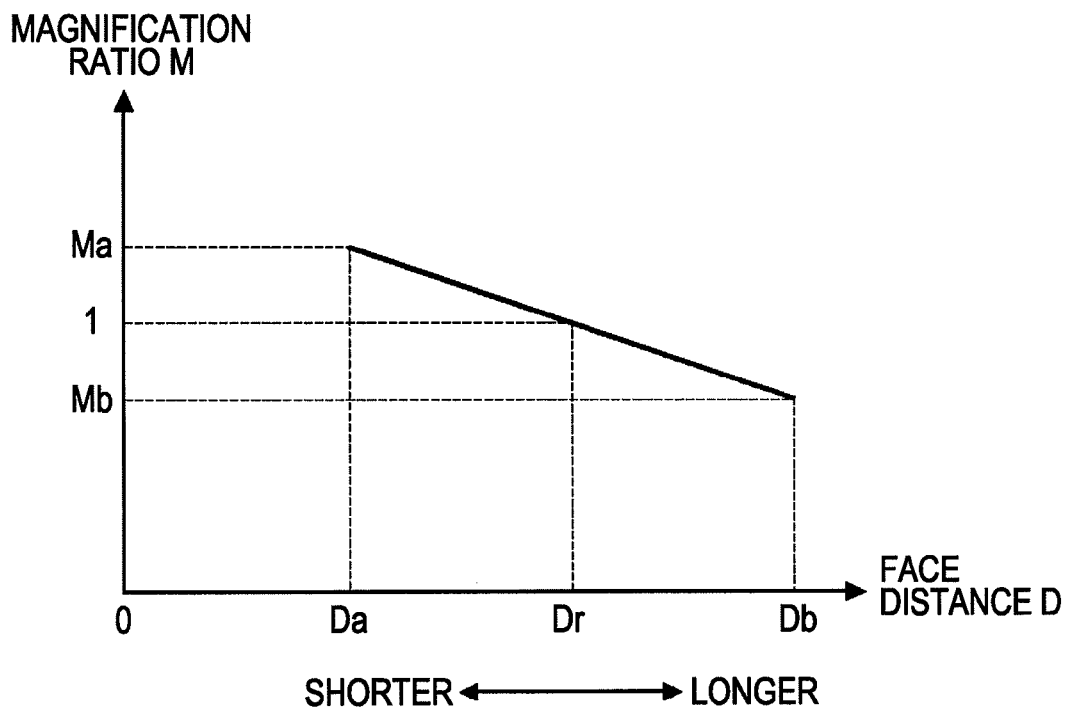
FIGS. 11A and 11B are graphs depicting two examples of the magnification ratio of the display information to a face distance in an embodiment of the present invention.

FIG. 11A is a graph depicting a relation between a magnification ratio M and a face distance D. The face distance D changes between a predetermined short distance Da and a predetermined long distance Db, their center being an intermediate reference distance Dr. When the face distance D changes from the reference distance Dr to the short distance Da, the magnification ratio M successively changes from 1 to Ma (Ma>1). When the face distance D changes from the reference distance Dr to the long distance Db, the magnification ratio M successively changes from 1 to Mb (Mb<1). The magnification ratio M may change not successively but stepwise.

Figure 11B:
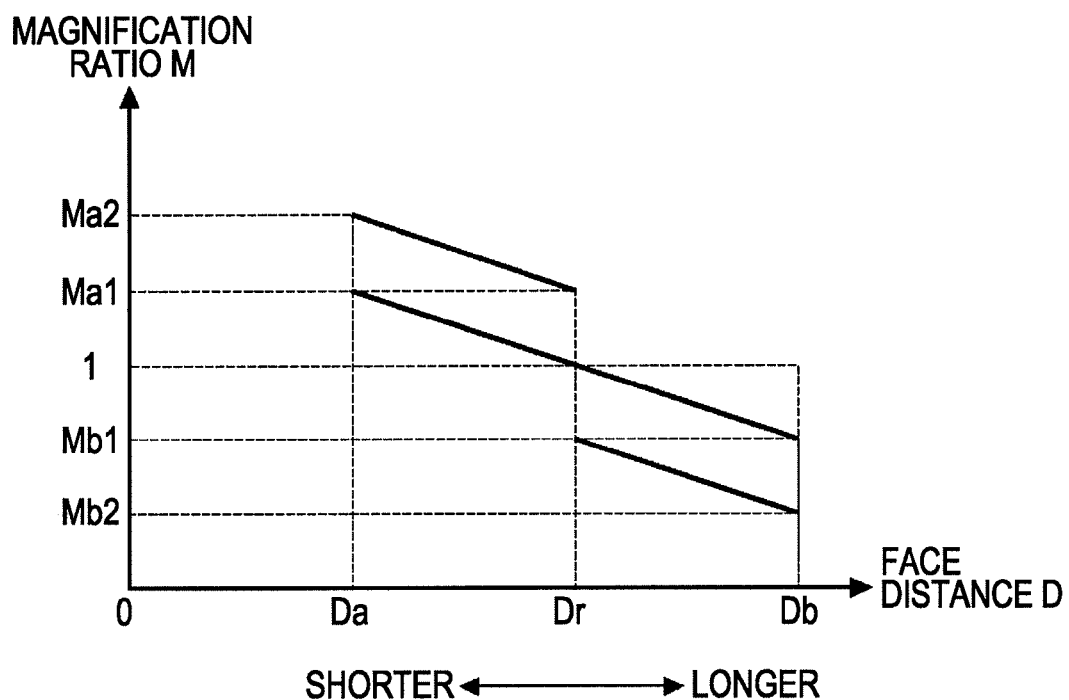

In this manner, in the present embodiment, the magnification ratio of the display image is determined according to the difference (or ratio) of a measurement value with respect to the reference value of the face distance. However, a variable range from the short distance Da to the long distance Db is restricted by itself. For example, after the face is moved closest to the screen from an intermediate face distance to a position represented by the short distance Da where the screen can be visually viewed and the display image is enlarged to a size with a magnification ratio Ma1, when the display image is desired to be further enlarged, it is difficult to move the face closer. In such cases, a specific face change (for example, closing one or both of eyes) is used. With such a face change being detected, even when the face distance is changed, the current magnification ratio for the display contents can be maintained. For example, as depicted in FIG. 11B, to further enlarge the display contents after the magnification ratio becomes Ma1 with the face distance Da, the face is returned to the reference distance Dr with the specific face change, and then the face is moved closer again without a face change. With this, a larger magnification ratio Ma2 can be obtained.

The similar operation can also be performed for reduction. That is, when the display image is desired to be further reduced after the face is moved away from the screen to the distance Db to reduce the display image to a magnification ratio Mb1, the face is returned to the reference distance Dr with the specific face change, and then the face is again moved away without a face change. With this, a smaller magnification ratio Mb2 can be obtained.

The specific face change is not restricted to closing eye(s). An arbitrary face change recognizable from the captured face image can be used. For example, the specific face change may be opening the mouth.

Figure 12A:
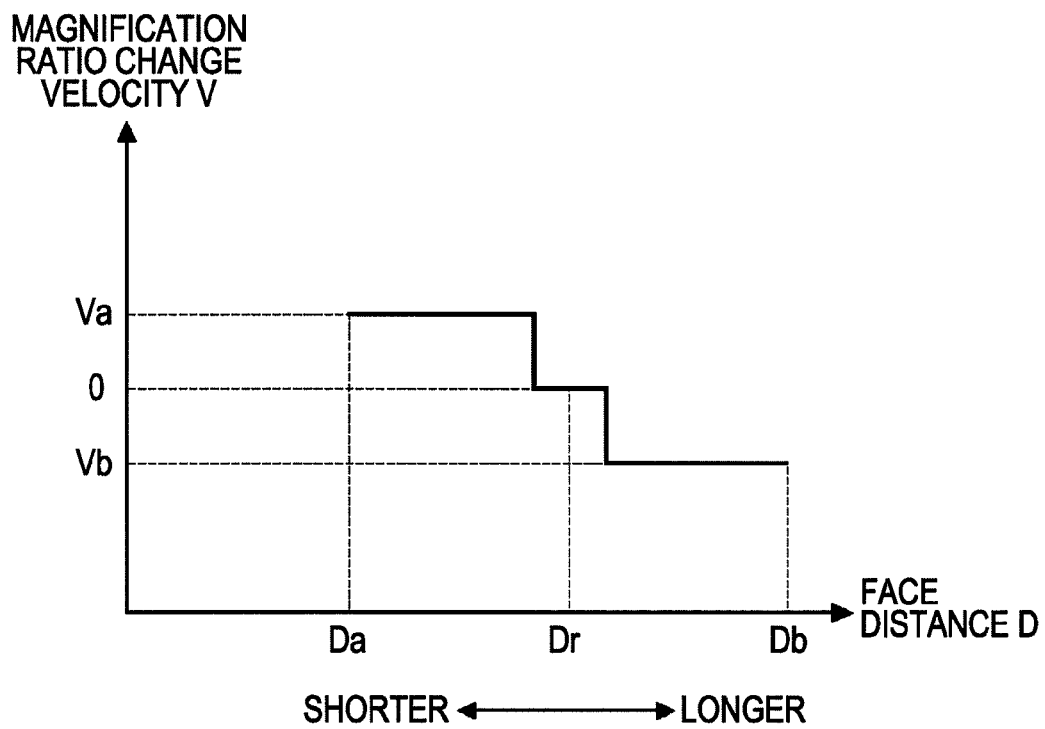
FIGS. 12A and 12B are graphs depicting other two examples of the magnification ratio of the display information to the face distance in an embodiment of the present invention.

In another technique of enlarging the variable ranges, as depicted in FIG. 12A, when the face distance is the predetermined reference distance Dr (as depicted in FIG. 12A, a certain range of neutral zone may be provided), a magnification ratio change velocity V is set at 0 (that is, the magnification ratio is maintained at the current value). While the face distance D is shorter than the reference distance Dr, a magnification ratio change velocity is set at a predetermined positive value Va, and enlargement is continued. Conversely, while the face distance D is larger than the reference distance Dr, the magnification ratio change velocity is set at a predetermined negative value Vb, and reduction is continued. In this case, the operator normally places his/her face near the reference distance Dr. When the operator desires to enlarge the display contents, the operator moves his/her face closer to the terminal. With this, the display contents are enlarged successively or stepwise at the magnification ratio change velocity Va. When the face distance is returned to the vicinity of reference distance Dr with enlargement to a desired magnification ratio, enlargement is stopped, and the magnification ratio at that moment is maintained. Conversely, when the display contents are desired to be reduced, the face is moved away from the terminal. With this, the display contents are reduced successively or stepwise at the magnification ratio change velocity Vb. When the face distance is returned to the original with reduction at a desired magnification ratio, reduction is stopped, and the magnification ratio at that moment is maintained.

Figure 12B:
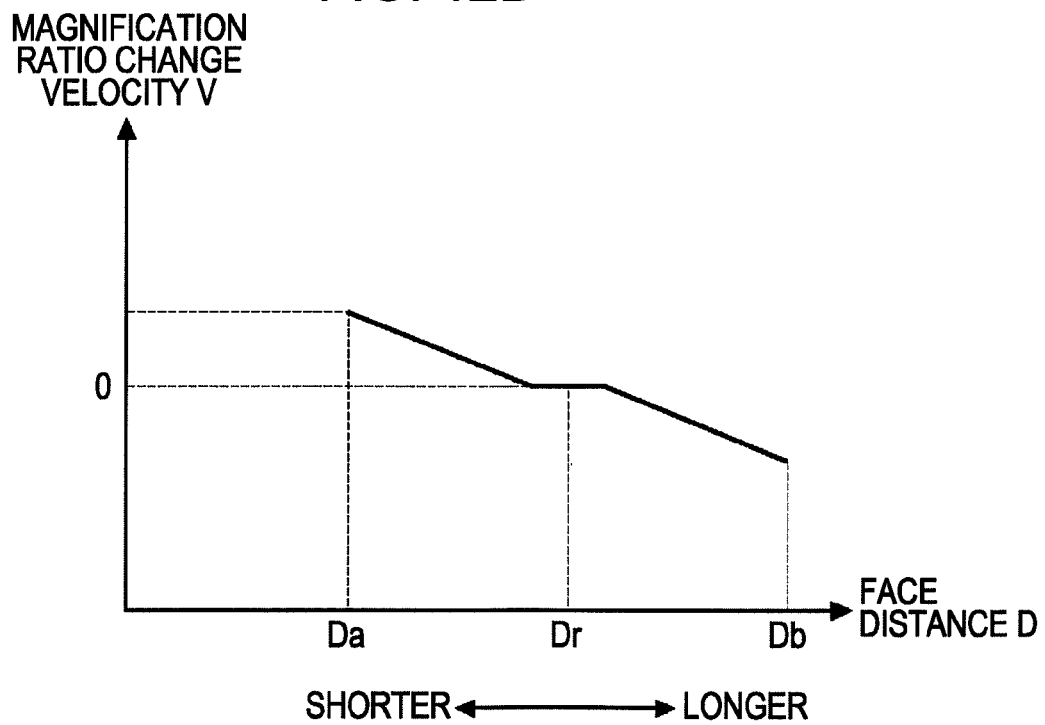

The reference distance Dr and its neutral zone may each have a predetermined fixed value, or may be arbitrarily set by the operator. Also, as depicted in FIG. 12B, the magnification ratio change velocity may be constant irrespectively of a change of the face distance, or the change velocity may be changed according to an absolute value of the difference between the face distance and the reference value of the face distance (the change velocity may be increased as the absolute value is larger).

Figure 13A:
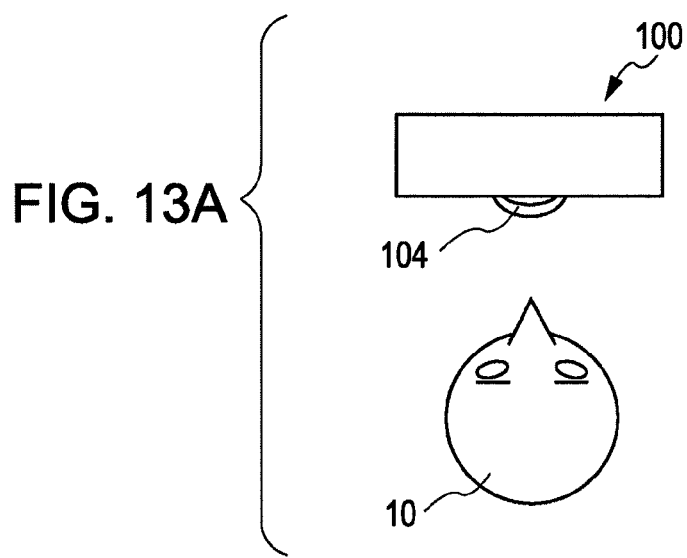
FIGS. 13A and 13B depict an example when the display contents are moved in a hands-free manner in an embodiment of the present invention.

While the operation of enlarging/reducing the display contents have been described above, the display contents can also be moved in a hands-free manner. Such an example is described with reference to FIGS. 13A, 13B, 14A, 14B, 15A, and 15B. Each of FIGS. 13A, 14A, and 15A depicts a positional relation between the operator 10 and the mobile terminal 100. Each of FIGS. 13B, 14B, and 15B depicts a display example of display information (here, a map) in each case.

Figure 13B:
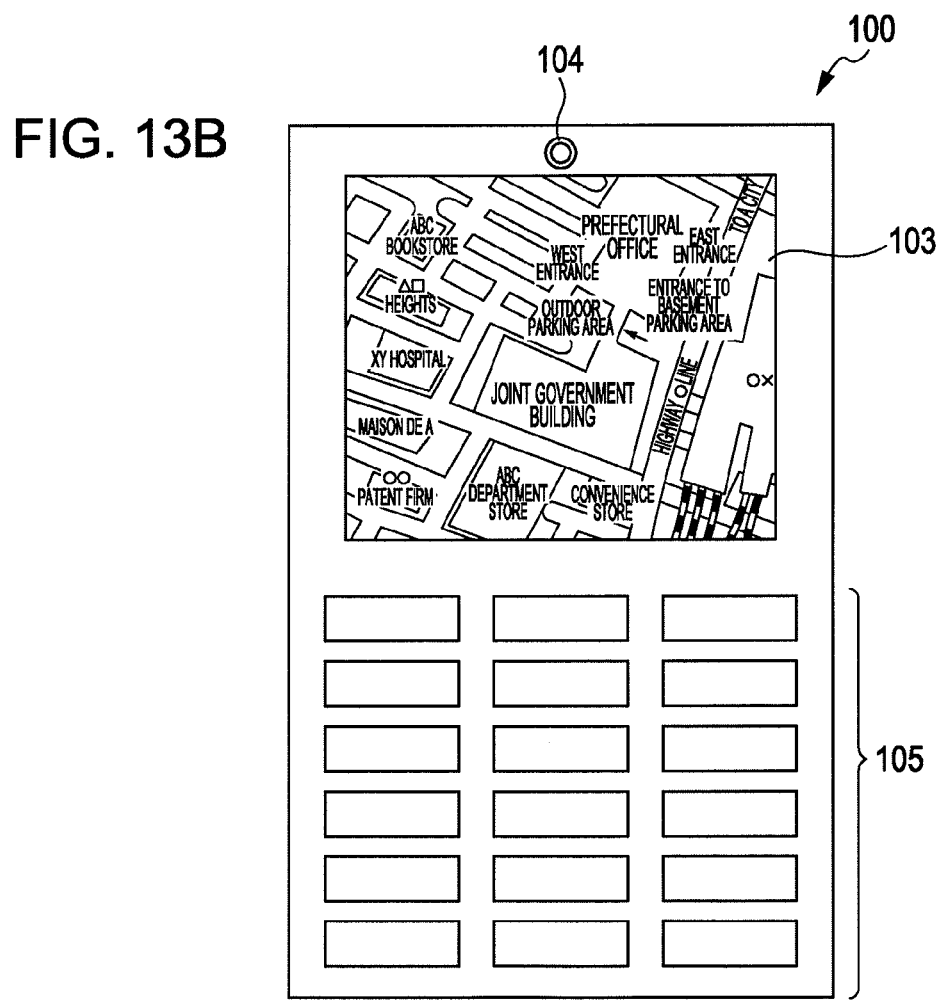
Figure 14A:
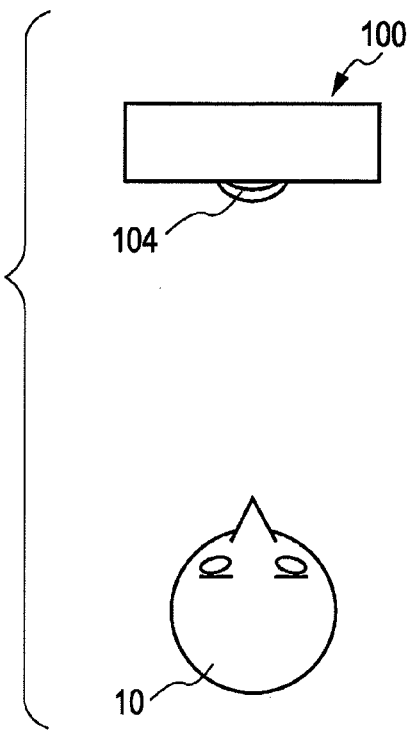
FIGS. 14A and 14B depict an example continued from FIGS. 13A and 13B.
Figure 14B:
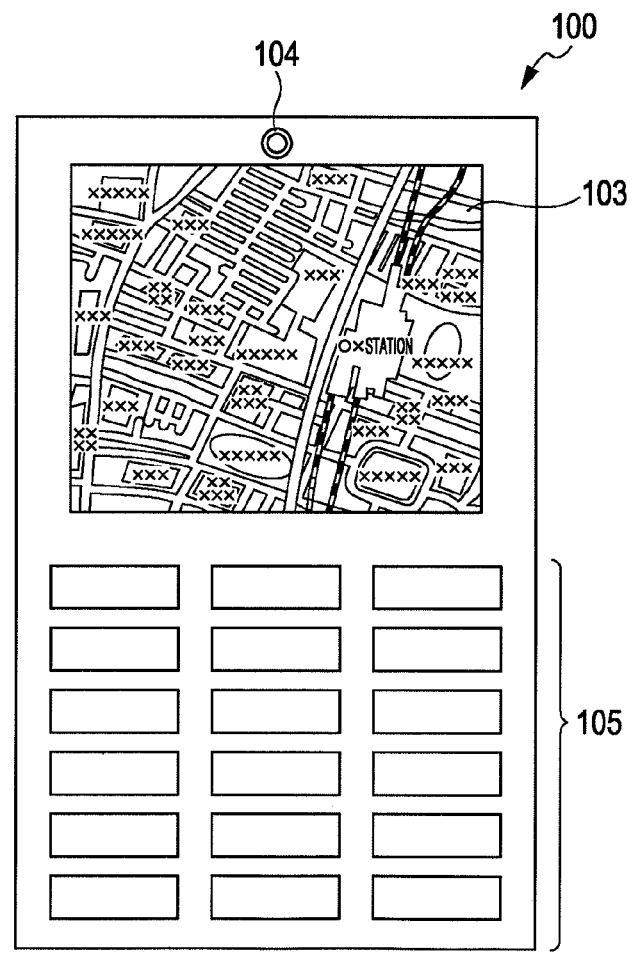
Figure 15A:
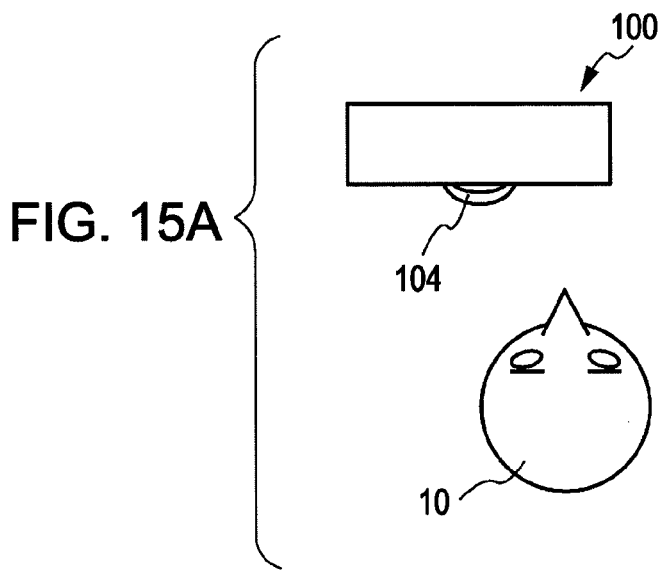
FIGS. 15A and 15B depict an example continued from FIGS. 14A and 14B.

When the map is displayed at a magnification ratio as depicted in FIG. 13B in the state of the face distance as depicted in FIG. 13A, if the face is moved away from the mobile terminal 100 as depicted in FIG. 14A to increase the face distance, the magnification ratio of the map is decreased to cause a reduced display. As a result, a wide range of areas can be viewed.

From this state, when the operator 10 moves his/her face in a right direction closer to the mobile terminal 100 as depicted in FIG. 15A, a face distance is detected, and a face position is also detected by the face position detecting unit 315 (FIG. 3) described above. With this movement of the face position, the display contents are also moved. In the example depicted in FIGS. 15A and 15B, when the face is moved to right while facing the mobile terminal 100, the map is moved in a left direction on the display screen. Also, simultaneously with a decrease in the face distance, the map is enlarged for display. In this operation, by moving the face in an end direction on a side on the display screen the operator 10 desires to view, display information hidden on an end side is moved to a screen center side. To view information about a station at right on the screen in FIG. 14B in more detail, the operator 10 moves his/her face in a right direction closer to the terminal as depicted in FIG. 15A for display. As a result, the information about the station is displayed as being enlarged on the display unit 103 as depicted in FIG. 15B.

Figure 15B:
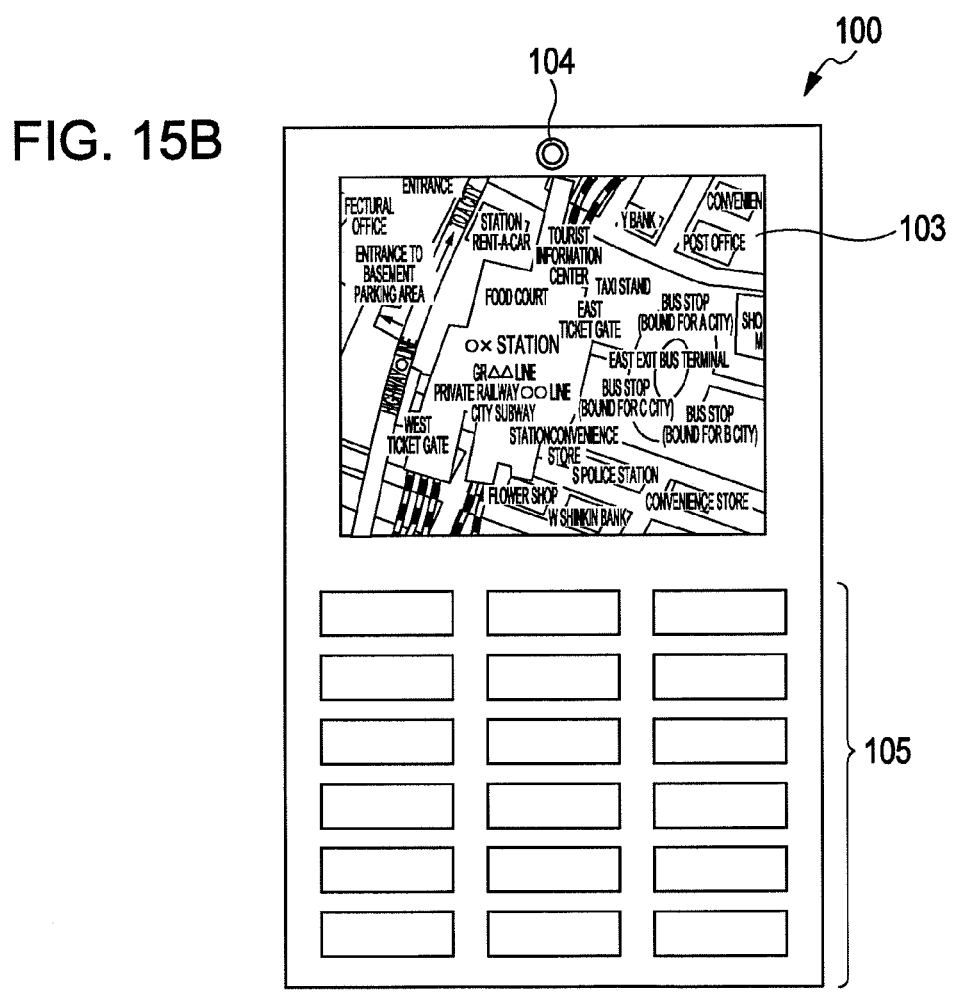

Contrary to the example in FIGS. 15A and 15B, by moving the face to left, the map is moved in a right direction on the display screen. The similar operation can also be performed not only in a horizontal direction but also in a vertical direction.

By determining a position and dimension of the face image together and moving the map for display while changing the magnification ratio, a large range of information can be comfortably viewed even with a small display screen of the mobile terminal. That is, a detailed display and an at-a-glance display can be intuitively switched for use in a hands-free manner.

The variable ranges are restricted also for the movement of the face. As with enlargement and reduction, two techniques (not illustrated) are available to cope with this restriction. In a first technique, in the case where the display contents are moved according to the movement amount of the face, the movement of the display contents does not reflect the movement of the face when a state of a specific face change is detected.

In a second technique, the display contents are continuously moved in a predetermined direction defined by a direction of a shift in the face position with respect to a reference position (typically, a front center of the terminal). That is, the face is moved from the center in a direction of a hidden portion of the display contents to be desired to be viewed, and then the face is returned to the center when the display contents are moved by a desired amount.

Here, the movement of the display information does not continue infinitely. After an end of the display information (for example, an end of a page) appears on the display screen, the movement stops regardless an instruction for movement.

In the example above, the display contents are enlarged when the face gets closer to the terminal, and are reduced when the face moves away from the terminal. Conversely, in another example, the display contents may be enlarged when the face moves away from the terminal, and be reduced when the face gets closer to the terminal. This can support presbyopic operators.

As described above, according to the present embodiment, the display contents of the terminal can be easily enlarged or reduced even by an operator with weak eyesight. With a myopic operator moving his/her eyes closer to the terminal or with a presbyopic operator moving his/her eyes away from the terminal, the display information is enlarged. With this, the information displayed on the screen can be used even when the displayed information difficult to view.

While the preferred embodiments of the present invention have been described above, various modifications and changes can be made other than those described above.

For example, these various operations described above can be performed by providing a plurality of display modes and selectively setting any one of the display modes by the operator.

While the face distance detecting unit uses the imaging unit in the example above, another distance detecting unit using infrared rays or ultrasonic waves may be used instead.

Furthermore, the above description assumes the mobile terminal to be a mobile phone terminal, but the mobile terminal may not necessarily have a phone function. For example, any mobile terminal having a display screen, such as a PDA, a game machine, and a small PC, is applicable. Moreover, though the mobile terminal according to the embodiments of the present invention is preferably a portable-type mobile terminal, the mobile terminal is not limited to the portable type. The face distance detecting unit using a camera or the like can be included in a generally-used PC or a terminal installed in a public space, such as a ticket dispenser or a guide board.

In the example above, the face distance and the face position are both detected. However, when only enlarging or reducing the display contents is performed without movement, a detector configured to detect a face position can be omitted.

In the example above, the lens of the imaging unit is positioned above the rectangular display screen in portrait orientation. Alternatively, the lens can be positioned on a side of the display screen in landscape orientation for use. In this case, as with the case above, the face position may be corrected with an amount of shift between the center of the display screen and the imaging unit.

Whether to apply the operation of changing the display magnification ratio based on the face distance (and the moving operation based on the face position) described above may be defined fixedly for each application or by user's settings.

According to the embodiments of the present invention, there are also provided a computer program causing a computer to perform the functions described in the above embodiments, and a recording medium which stores the program in a computer readable manner. Examples of the recording medium for supplying the program include a magnetic recording medium (a flexible disk, a hard disk, magnetic tape, and the like), an optical disk (a magneto-optical disk such as an MO or a PD, a CD, a DVD, and the like), a semiconductor storage, paper tape, and so on.

The present application contains subject matter related to that disclosed in Japanese Priority Patent Application JP 2009-015137 filed in the Japan Patent Office on Jan. 27, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. A display apparatus comprising:
display means for displaying information on a display screen;
distance detecting means for detecting a distance from the display screen to the face of an operator; and
control means for causing the information to be enlarged or educed on the display screen in response to a change of the detected distance, wherein the distance detecting means includes imaging means for capturing an image of the face of the operator who is viewing the display screen, and the control means detects the distance from the display screen to the face of the operator by detecting a ratio of a face image of the operator to the captured image,
wherein the control means determines a magnification ratio of the image according to a ratio or difference in detection size of the face image with respect to a reference size,
wherein the control means causes the magnification ratio of the image to increase when the detected distance from the display screen to the face of the operator changes in one direction from a start distance and causes the magnification ratio to decrease when the detected distance changes in an opposite direction, and wherein the control means is configured to detect a specific face change in the image of the face of the operator, wherein in response to the specific face change, the magnification ratio is maintained at its last changed ratio even when the distance from the display screen to the face of the operator is returned toward the start distance and further, when the specific face change no longer is detected, the magnification ratio is increased or decreased again when the detected distance from the display screen to the face of the operator changes in said one or opposite direction once again.

2. The display apparatus according to claim 1, wherein the control means continues to cause the information to be enlarged or reduced successively or stepwise according to a sign of the difference in detection size of the face image with respect to the reference size, and stops changing the magnification ratio when the difference becomes 0.

3. The display apparatus according to claim 1, wherein the magnification ratio is increased as the distance is shorter.

4. The display apparatus according to claim 1, wherein the magnification ratio is decreased as the distance is shorter.

5. The display apparatus according to claim 1, wherein a first display mode and a second display mode that are selectable by the operator are provided, and the magnification ratio is increased as the distance is shorter in the first display mode and the magnification ratio is decreased as the distance is shorter in the second display mode.

6. The display apparatus according to claim 1, wherein the control means causes the information to be moved for display in a predetermined direction associated with a moving direction of the face in response to a change in position of the face of the operator in a direction parallel to the display screen.

7. The display apparatus according to claim 6, wherein the control means determines a movement amount for moving the information for display according to a difference in detected position of the face image with respect to a reference position.

8. The display apparatus according to claim 6, wherein the control means causes the information to be successively moved for display according to a sign of a difference in detected position of the face image with respect to the reference position, and stops movement when the difference becomes 0.

9. A display control method comprising the steps of:
displaying information on a display screen;
detecting a distance from the display screen to the face of an operator; and
causing the information to be enlarged or reduced on the display screen in response to a change of the detected distance, wherein the step of detecting the distance includes the steps of:
capturing an image of the face of the operator who is viewing the display screen; and
detecting a ratio of a face image of the operator to the captured image,
wherein a magnification ratio of the image is determined according to a ratio or difference in detection size of the face image with respect to a reference size,
the magnification ratio of the image increases when the detected distance from the display screen to the face of the operator changes in one direction from a start distance and the magnification ratio decreases when the detected distance changes in an opposite direction, and
wherein the magnification ratio is maintained at its last changed ratio even when the distance from the display screen to the face of the operator is returned toward the start distance when a specific face change is detected in the image of the face of the operator, and further, when the specific face change no longer is detected, the magnification ratio is increased or decreased again when the detected distance from the display screen to the face of the operator changes in said one or opposite direction once again.

10. A non-transitory computer readable medium causing a computer to execute the steps of:
displaying information on a display screen;
detecting a distance from the display screen to the face of an operator; and
causing the information to be enlarged or reduced on the display screen in response to a change of the detected distance, wherein the step of detecting the distance includes the steps of:
capturing an image of the face of the operator who is viewing the display screen; and
detecting a ratio of a face image of the operator to the captured image,
wherein a magnification ratio of the image is determined according to a ratio or difference in detection size of the face image with respect to a reference size,
the magnification ratio of the image increases when the detected distance from the display screen to the face of the operator changes in one direction from a start distance and the magnification ratio decreases when the detected distance changes in an opposite direction, and
wherein the magnification ratio is maintained at its last changed ratio even when the distance from the display screen to the face of the operator is returned toward the start distance when a specific face change is detected in the image of the face of the operator, and further, when the specific face change no longer is detected, the magnification ratio is increased or decreased again when the detected distance from the display screen to the face of the operator changes in said one or opposite direction once again.

11. A display apparatus comprising:
a display unit displaying information on a display screen;
a distance detector detecting a distance from the display screen to the face of an operator; and
a controller causing the information to be enlarged and reduced on the display screen in response to a change of the detected distance, wherein the distance detector includes imaging means for capturing an image of the face of the operator who is viewing the display screen, and the controller detects the distance from the display screen to the face of the operator by detecting a ratio of a face image of the operator to the captured image,
wherein the controller determines a magnification ratio of the image according to a ratio or difference in detection size of the face image with respect to a reference size,
wherein the controller causes the magnification ratio of the image to increase when the detected distance from the display screen to the face of the operator changes in one direction from a start distance and causes the magnification ratio to decrease when the detected distance changes in an opposite direction, and
wherein the controller is configured to detect a specific face change in the image of the face of the operator, wherein in response to the specific face change, the magnification ratio is maintained at its last changed ratio even when the distance from the display screen to the face of the operator is returned toward the start distance and further, when the specific face change no longer is detected, the magnification ratio is increased or decreased again when the detected distance from the display screen to the face of the operator changes in said one or opposite direction once again.

* * * * *